United States Patent
McCloskey et al.

(10) Patent No.: US 10,414,598 B2
(45) Date of Patent: Sep. 17, 2019

(54) TRACKED RADIAL STACKER WITH WHEELS

(71) Applicant: McCloskey International Limited, Keen (CA)

(72) Inventors: James Paschal McCloskey, Keen (CA); Al Nottingham, Keen (CA)

(73) Assignee: McCloskey International Limited, Keen, Ontario (CA)

(*) Notice: Subject to any disclaimer, the term of this patent is extended or adjusted under 35 U.S.C. 154(b) by 0 days.

(21) Appl. No.: 15/985,353

(22) Filed: May 21, 2018

(65) Prior Publication Data

US 2018/0265302 A1    Sep. 20, 2018

Related U.S. Application Data

(63) Continuation-in-part of application No. 15/640,134, filed on Jun. 30, 2017, now Pat. No. 10,011,443.
(Continued)

(51) Int. Cl.
*B65G 21/12* (2006.01)
*B65G 41/00* (2006.01)
(Continued)

(52) U.S. Cl.
CPC .......... *B65G 41/008* (2013.01); *B65G 19/04* (2013.01); *B65G 41/002* (2013.01);
(Continued)

(58) Field of Classification Search
None
See application file for complete search history.

(56) References Cited

U.S. PATENT DOCUMENTS 8,025,140 B2 * 9/2011 Whyte ................. B02C 21/026
                                                            198/313
8,123,019 B2    2/2012 Johannsen
(Continued)

FOREIGN PATENT DOCUMENTS

| EP | 2883819 A1 | 6/2015 |
| GB | 2478824 A | 9/2011 |
| WO | 2011/151378 A1 | 12/2011 |

*Primary Examiner* — Kavel Singh
(74) *Attorney, Agent, or Firm* — Schwabe, Williamson & Wyatt, P.C.

(57) ABSTRACT

A tracked, portable radial stacker for stockpiling bulk material including a linear conveyor having a rear portion and a front portion and being designed to carry bulk material from a low position adjacent the rear portion to a higher position adjacent the front portion. A foot may be disposed adjacent the rear portion of the conveyor and designed to selectively contact the ground to facilitate pivoting of the conveyor. A continuous track system may include a frame to which the conveyor is mounted, the track system including a pair of driven, parallel tracks designed to contact the ground to convey the stacker from one position to another, and to be lifted off the ground when desired. A pair of mid-wheels may be mounted to the frame to be moveable between a raised position in which they do not contact the ground and a lowered position in which they contact the ground and lift the tracks off the ground. A rear wheel may be mounted adjacent the rear portion of the conveyor to be moveable between a raised position in which it does not contact the ground and a lowered position in which it contacts the ground and lifts the tracks off the ground to permit movement of the conveyor on the rear wheel.

15 Claims, 12 Drawing Sheets

Related U.S. Application Data

(60) Provisional application No. 62/427,091, filed on Nov. 28, 2016.

(51) Int. Cl.
*B65G 67/60* (2006.01)
*B65G 19/04* (2006.01)

(52) U.S. Cl.
CPC ........ *B65G 67/606* (2013.01); *B65G 2201/04* (2013.01); *B65G 2814/0397* (2013.01)

(56) References Cited

U.S. PATENT DOCUMENTS

| | | | |
|---|---|---|---|
| 8,739,956 B2 * | 6/2014 | Smith | B65G 41/008 |
| | | | 180/6.48 |
| 2013/0048465 A1 | 2/2013 | Friesen | |

* cited by examiner

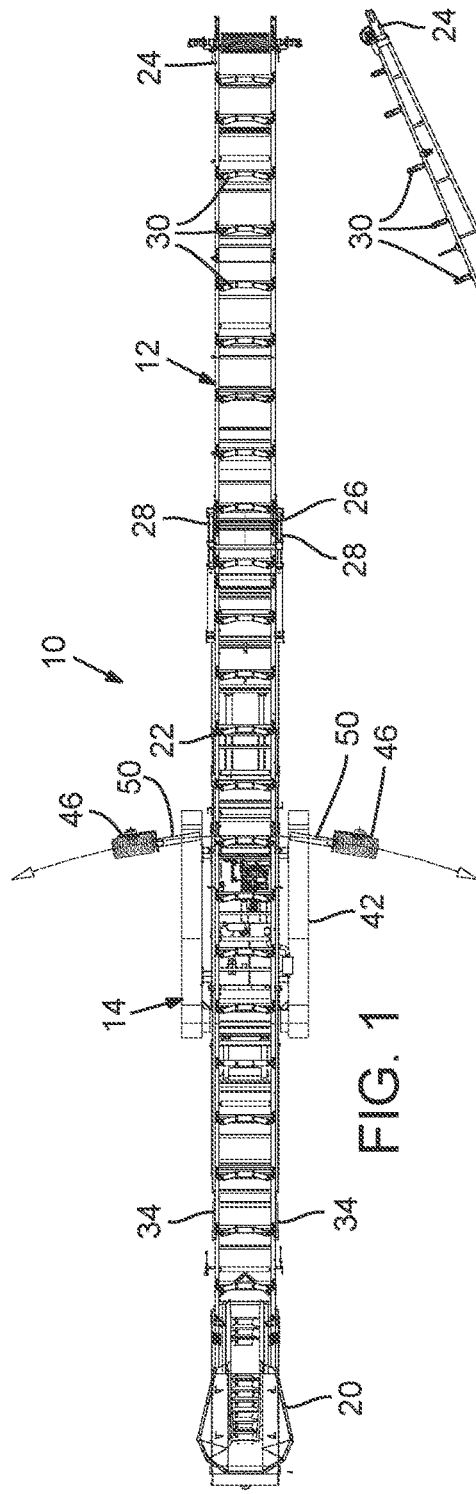
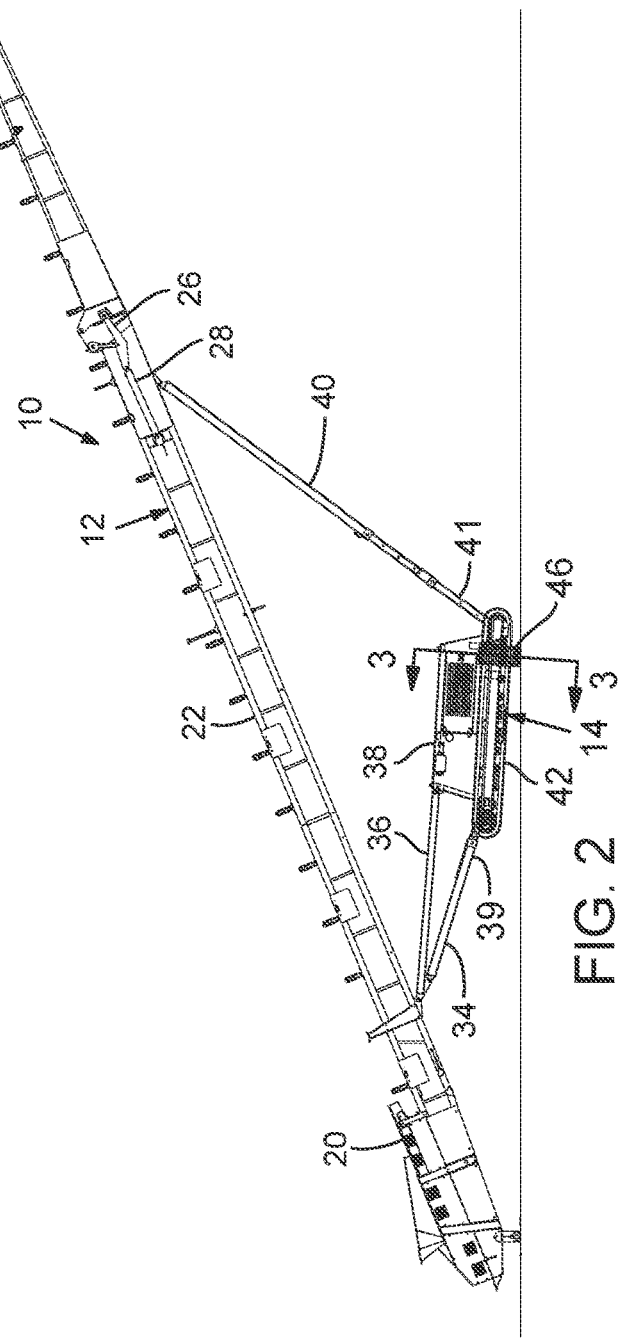
FIG. 1
FIG. 2

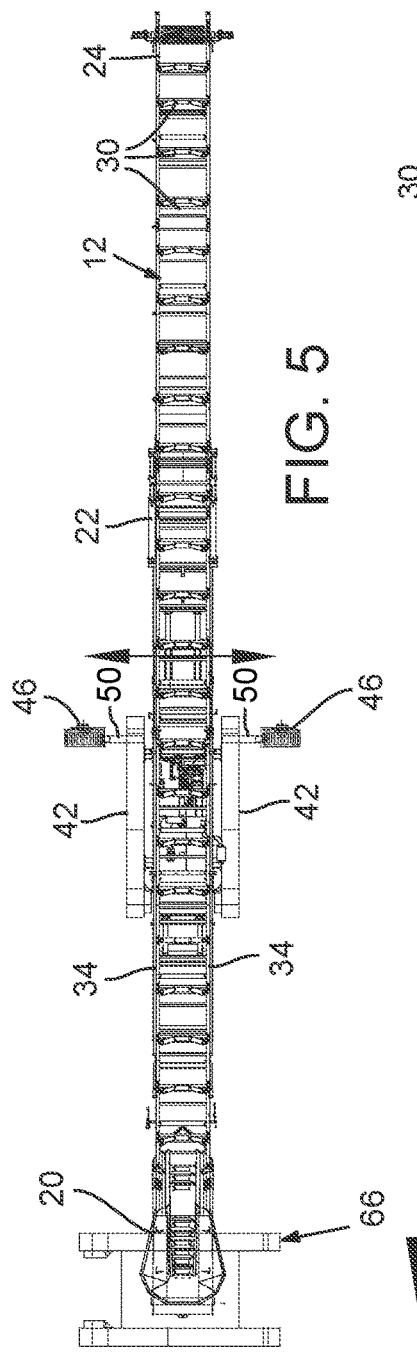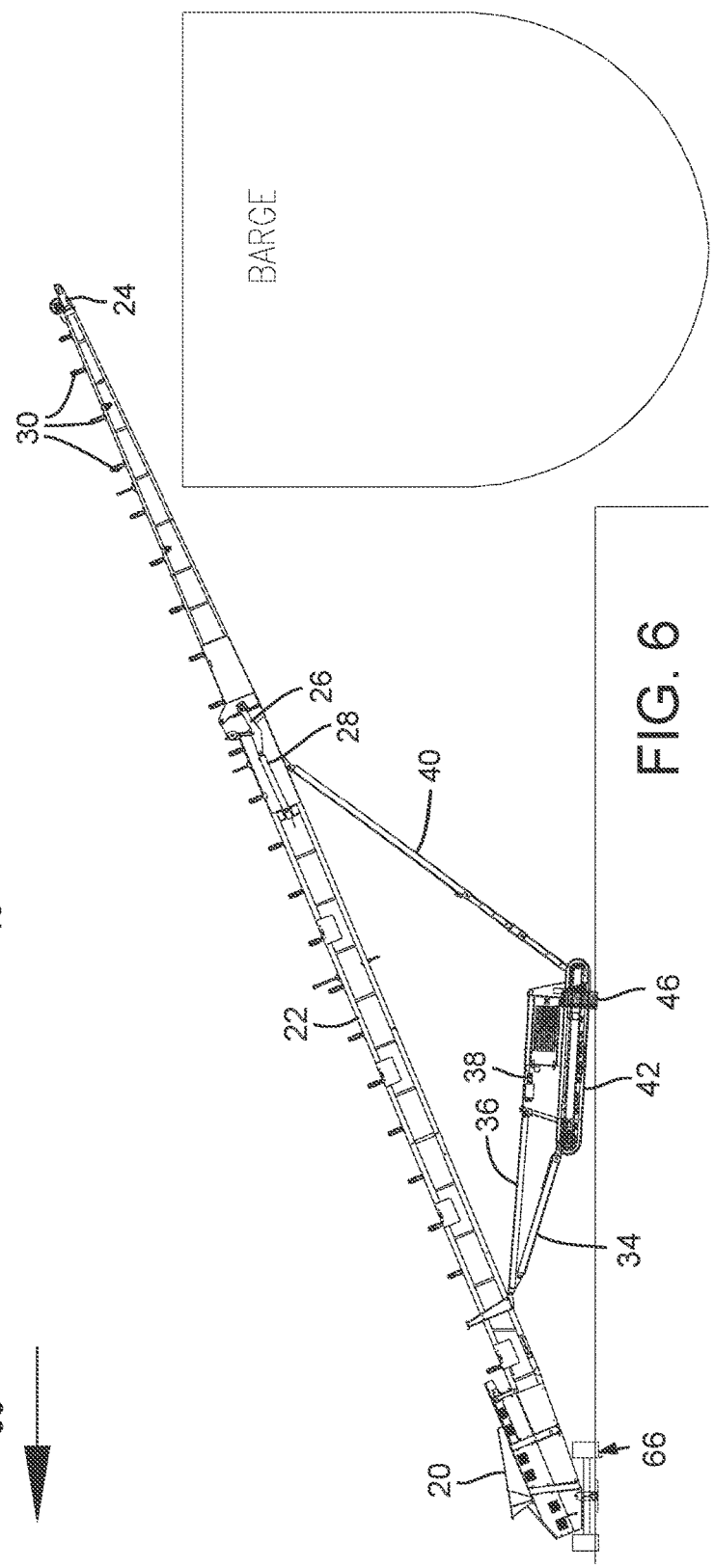

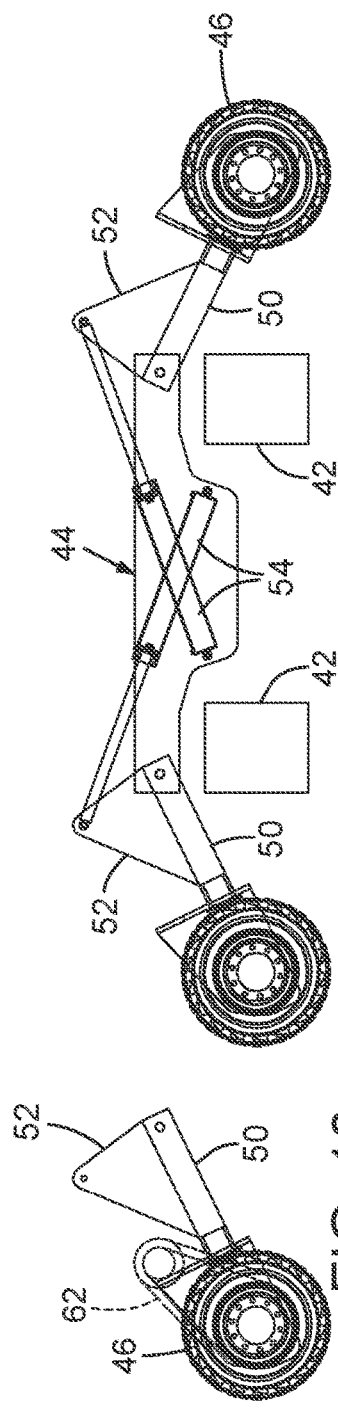
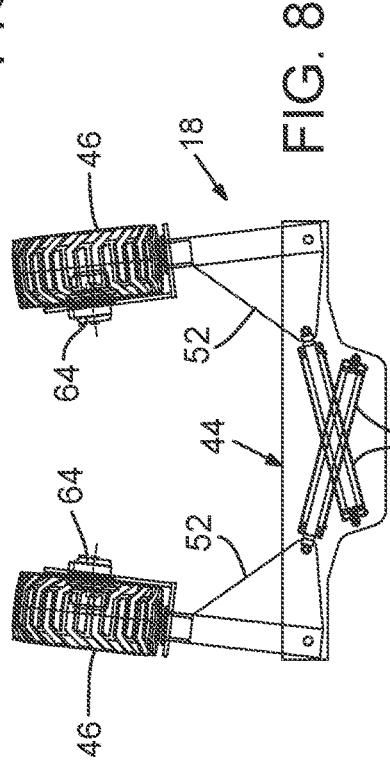
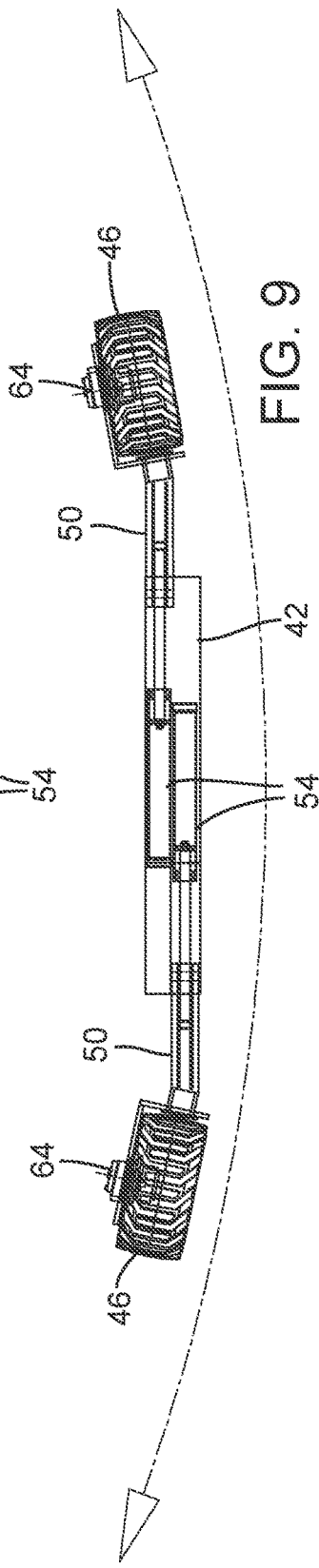
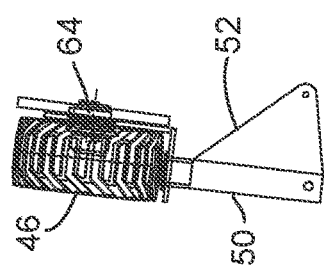

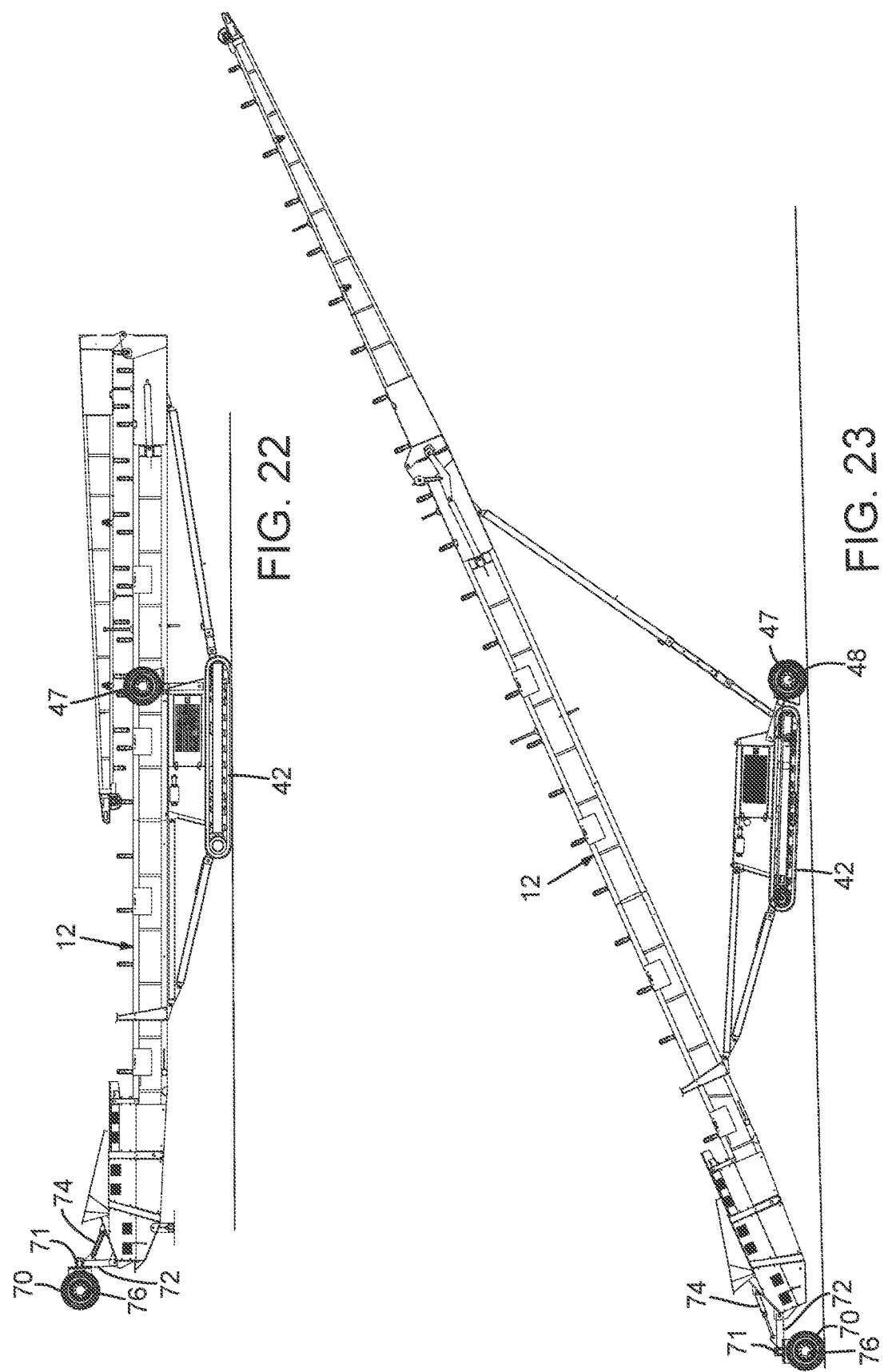

TRACKED RADIAL STACKER WITH WHEELS

CROSS REFERENCE TO RELATED APPLICATIONS

The present application is a continuation-in-part application and claims priority to U.S. Provisional Patent Application No. 62/427,091, filed Nov. 28, 2016, and U.S. Nonprovisional patent application Ser. No. 15/640,134, filed Jun. 30, 2017 entitled "Tracked Radial Stacker with Wheels," the entire disclosures of which is incorporated by reference.

TECHNICAL FIELD

Embodiments herein relate to systems for moving conveyors, usually of the belt-type, used to convey bulk material from a screening or crushing plant to a location where such material is stacked.

BACKGROUND

Portable radial stackers have been used for many years to stack bulk materials such as aggregate for road construction, grain and coal. Radial stackers, which swing around in a radius to stack material in an arc, permit substantially more material to be stacked than is possible using a conventional stationary stacker that permits only a conical stack. Telescoping radial stackers permit even more material to be stacked as the stacker is extended or retracted during conveying operations.

Radial stackers typically include a wheeled axle disposed between a hopper and the top of the stacker from which the material is discharged. These wheels permit the stacker to be swung in an arc, with the hopper including a pivot plate on which the stacker pivots.

An additional advantage of having a wheeled radial stacker is that the stacker may be folded over itself and be ready for road transport in relatively little time, as the wheels that are used for radial travel can be displaced into a position aligned with the stacker to support the stacker for travel.

In recent years, tracked drives have been used in quarries, agricultural and mining operations to enable equipment to be moved over harsh terrain for ideal positioning for stacking operations. While tracked vehicles have proven to be of great benefit for such purposes, the use of tracks instead of wheels makes it more difficult to shift a stacker radially to facilitate the stacking of material in an arc instead of a cone. Also, because tracked vehicles are not typically permitted to be driven on road surfaces, they are normally loaded onto flatbed trucks for transit from one work site to another. These two drawbacks with the use of tracks has to a certain extent limited the use of tracked vehicles.

BRIEF DESCRIPTION OF THE DRAWINGS

Embodiments will be readily understood by the following detailed description in conjunction with the accompanying drawings and the appended claims. Embodiments are illustrated by way of example, and not by way of limitation, in the figures of the accompanying drawings.

FIG. 1 is a top plan view of an embodiment with mid-wheels in a lowered position, ready for radial repositioning of the stacker;

FIG. 2 is a side elevation view of the embodiment of FIG. 1, showing the mid-wheels in a lowered position in contact with the ground and with the tracks elevated off the ground;

FIG. 5 is a top plan view of the embodiment of FIG. 1, showing the mid-wheels lowered to a 90 degree position for lateral (radial) travel, and including a track system mounted to the hopper for repositioning the entire stacker in a lateral direction;

FIG. 6 is a side elevation view of the embodiment of FIG. 1, corresponding with FIG. 5, including a schematic representation of a barge into which the stacker might be loading material as it is laterally moved from one position to another;

FIG. 7 is an end elevation view of a portion of the embodiment of FIG. 1, showing the position of the mid-wheels being controlled by hydraulic cylinders and in their lowered position in contact with the ground;

FIG. 8 is an end elevation view of a portion of the embodiment of FIG. 1, corresponding to FIG. 7, showing the position of the mid-wheels being controlled by hydraulic cylinders but in their raised position elevated from the ground, and rotated 90 degrees;

FIG. 9 is a fragmentary top plan view of the embodiment of FIG. 1 corresponding to FIG. 7 with the mid-wheels in their lowered position, ready for radial repositioning of the stacker, with the mid-wheels being powered by a hydraulic planetary drive;

FIG. 10 is a fragmentary end elevation view corresponding to that of FIG. 7 showing a single mid-wheel, with the mid-wheel being chain-driven;

FIG. 11 corresponds to that of FIG. 10 except that instead of a chain drive, it shows a hydraulic planetary drive;

Figure 20:
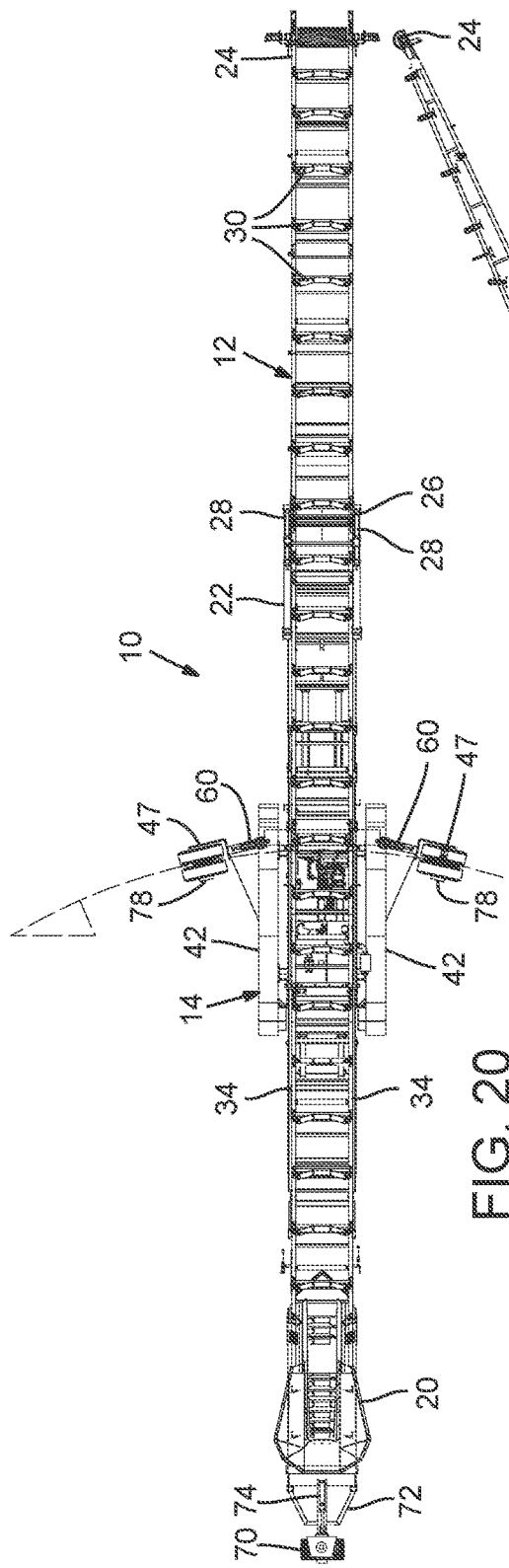
Figure 21:
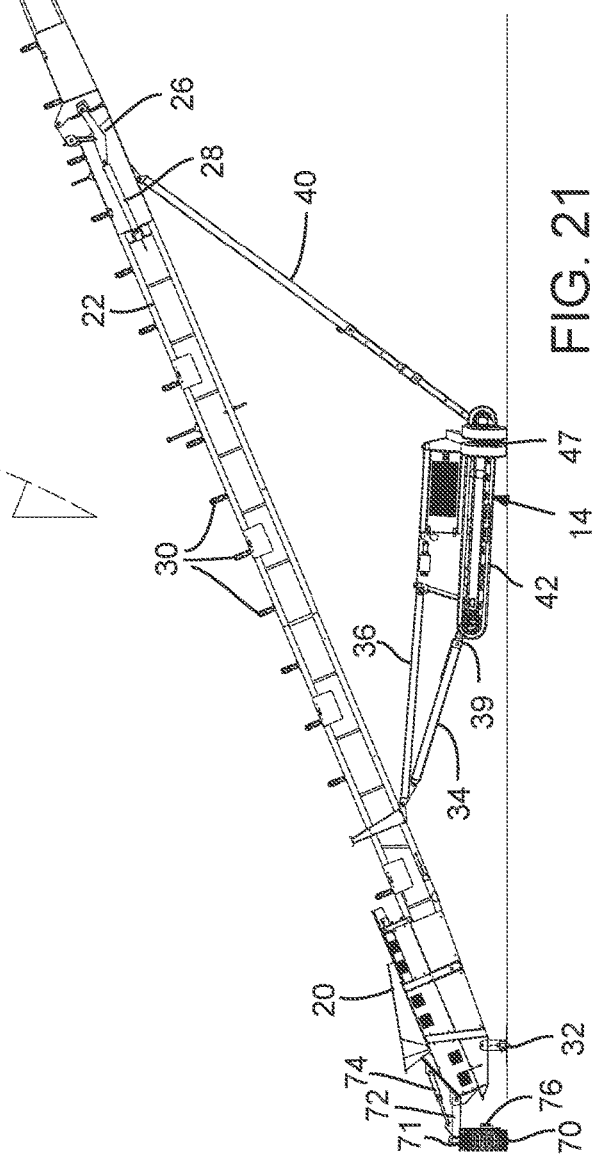

FIG. 20 is a top plan view of another embodiment that includes a rear wheel, here shown extending laterally;

FIG. 21 is a side elevation view of the embodiment of FIG. 20, also showing the rear wheel extending laterally and in its lowered position;

FIG. 22 is a side elevation view of the embodiment of FIG. 20, showing the mid-wheels and the rear wheel in elevated positions with the track contacting the ground, ready for movement around a job site or elsewhere; and FIG. 23 is a side elevation view of the embodiment of FIG. 20, showing the mid-wheels and the rear wheel in their lowered, longitudinal positions.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense.

Various operations may be described as multiple discrete operations in turn, in a manner that may be helpful in understanding embodiments. However, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

A tracked, portable radial stacker for stockpiling bulk material is provided. The stacker includes a linear conveyor having a rear portion and a front portion and being designed to carry bulk material from a low position adjacent the rear portion to a higher position adjacent the front portion. A foot may be disposed adjacent the rear portion of the conveyor and designed to selectively contact the ground to facilitate pivoting of the conveyor. A continuous track system may include a frame to which the conveyor is mounted, the track system including a pair of driven, parallel tracks designed to contact the ground to convey the stacker from one position to another, and to be lifted off the ground when desired. A pair of mid-wheels may be mounted to the frame to be moveable between a raised position in which they do not contact the ground and a lowered position in which they contact the ground and lift the tracks off the ground. A rear wheel may be mounted adjacent the rear portion of the conveyor to be moveable between a raised position in which it does not contact the ground and a lowered position in which it contacts the ground and lifts the tracks off the ground to permit movement of the conveyor on the rear wheel.

The mid-wheels and the rear wheel of the radial stacker may extend longitudinally or laterally.

Another way to describe the disclosure is a tracked, portable radial stacker for stockpiling bulk material that includes a linear conveyor having a rear portion and a front portion and being designed to carry bulk material from a low position adjacent the rear portion to a higher position adjacent the front portion. A foot is disposed adjacent the rear portion of the conveyor and designed to selectively contact the ground to facilitate pivoting of the conveyor. A continuous track system is also included that has a frame to which the conveyor is mounted, the track system including a pair of driven, parallel tracks designed to contact the ground to convey the stacker from one position to another, and to be lifted off the ground when desired. A pair of mid-wheels are mounted to the frame and a pair of mid-hydraulic cylinders are included for powering the mid-wheels between a raised position in which they do not contact the ground and a lowered position in which they contact the ground, the mid-hydraulic cylinders facilitating the lifting of the tracks off the ground as the mid-wheels are powered to their lowered position to permit movement of the conveyor on the mid-wheels.

A rear wheel is mounted adjacent the rear portion of the conveyor, and a rear hydraulic cylinder is included for powering the rear wheel between a raised position in which it does not contact the ground and a lowered position in which it contacts the ground. The rear hydraulic cylinder facilitates the lifting of the foot off the ground as the rear wheel is powered to its lowered position to permit movement of the conveyor on the rear wheel.

The mid-wheels and the rear wheel may extend longitudinally or laterally. They may optionally be swiveled by 90 degrees so the mid-wheels and the rear wheel can all extend either longitudinally or laterally. The mid-wheels and/or the rear wheel may be powered to enable the stacker to be moved under power. Both the mid-wheels and the rear wheels may be powered, and may be powered at different speeds.

Another way to describe the stacker is a tracked, portable radial stacker that includes a conveyor having a rear portion and a front portion and being designed to carry bulk material from a lower position adjacent the rear portion to a raised position adjacent the front portion. A continuous track system has a frame to which the conveyor is mounted, the track system including a pair of driven, parallel tracks designed to contact the ground to convey the stacker from one position to another, and to be lifted off the ground when desired. A pair of mid-wheels are mounted to the frame and powered between a raised position in which they do not contact the ground and a first lowered position, with the tracks being lifted off the ground as the mid-wheels are powered to their first lowered position. The mid-wheels may be laterally disposed in the first lowered position to permit lateral movement of the conveyor. The mid-wheels also may be pivotally mounted to the frame such that they can swivel to a raised longitudinal position and can be lowered to a second lowered position in which they are longitudinally disposed and engage the ground to permit longitudinal movement of the conveyor.

A rear wheel is mounted to the frame adjacent the rear portion of the conveyor and powered between a raised position in which it does not contact the ground and a first lowered position, with the foot being lifted off the ground as the rear wheel is powered to its first lowered position. The rear wheel may be laterally disposed in the first lowered position to permit lateral movement of the conveyor. The rear wheel may be pivotally mounted to the frame such that it can swivel to a raised longitudinal position and can be lowered to a second lowered position in which it is longitudinally disposed and engage the ground to permit longitudinal movement of the conveyor.

Yet another way to describe the stacker is that it includes a linear conveyor having a rear portion and a front portion, being designed to carry bulk material from a lower position adjacent the rear portion to a raised position adjacent the front portion. A continuous track system has a frame to which the conveyor is mounted, the track system including a pair of driven, parallel tracks designed to contact the ground to convey the stacker from one position to another, and to be lifted off the ground when desired.

A pair of mid-wheels are mounted to the frame and powered between a raised position in which they do not contact the ground and a first lowered position in which they are laterally disposed and engage the ground to facilitate lateral conveyance of the conveyor. The pair of mid-wheels may be rotatably mounted to the frame such that they can swivel at least 90 degrees to a raised longitudinal position and can be lowered to a second lowered position in which they are longitudinally disposed and engage the ground to facilitate longitudinal conveyance of the conveyor.

A mid-system may be provided for powering the pair of mid-wheels from the raised lateral position to the first lowered position, the mid-system also lifting the tracks off the ground as the mid-wheels are powered to the first lowered position to permit the conveyor to be conveyed in a lateral direction on the mid-wheels. The mid-system may also power the mid-wheels from the raised longitudinal position to the second lowered position, the mid-system also lifting the tracks off the ground as the mid-wheels are powered to the second lowered position to permit the conveyor to be conveyed in a longitudinal direction on the mid-wheels.

A rear wheel is mounted adjacent the rear portion of the conveyor, the rear wheel being displaceable between a raised position in which it does not contact the ground and a lowered position in which the rear wheel contacts the ground. The rear wheel may be pivotable between a longitudinal position and a lateral position. A rear system may be provided for pivoting the rear wheel from the raised position to the lowered position and to lift the foot off the ground as the rear wheel is powered to the lowered position to facilitate movement of at least the rear portion of the conveyor in either a lateral or longitudinal direction, depending on the position of the rear wheel.

Figure 3:
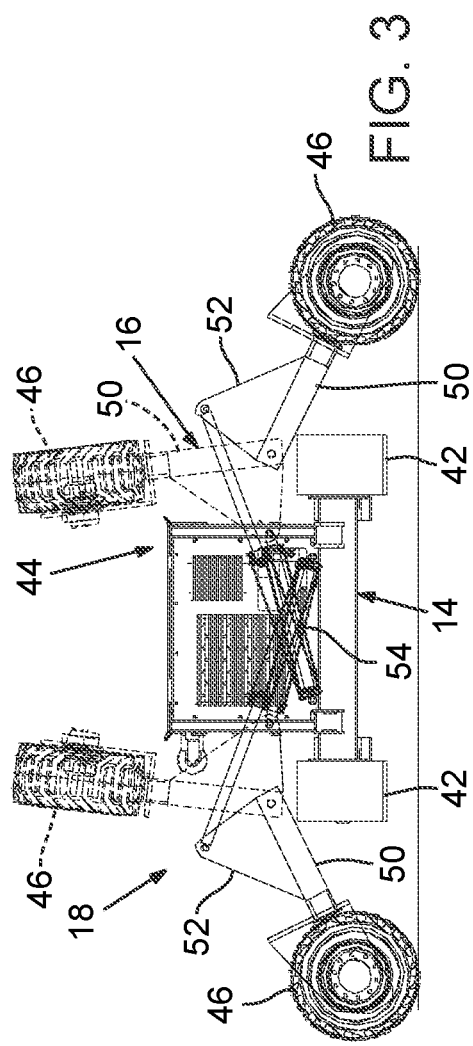
FIG. 3 is an end elevation view of a portion of the embodiment of FIG. 1 taken along line 3-3 of FIG. 2, showing the mid-wheels in a lowered position and, in phantom, in a raised position.

A tracked stacker is identified generally at 10 in the figures. FIGS. 1 and 2 show stacker 10 to be ready to be radially shifted (sometimes referred to herein as "lateral movement" or "laterally"). Stacker 10 includes a conveyor, indicated generally at 12, a track system, indicated generally at 14, and a wheel system, indicated generally at 16. A system for elevating and lowering stacker 10, indicated generally at 18, is shown in FIG. 3, taken along line 3-3 of FIG. 2.

Figure 4:
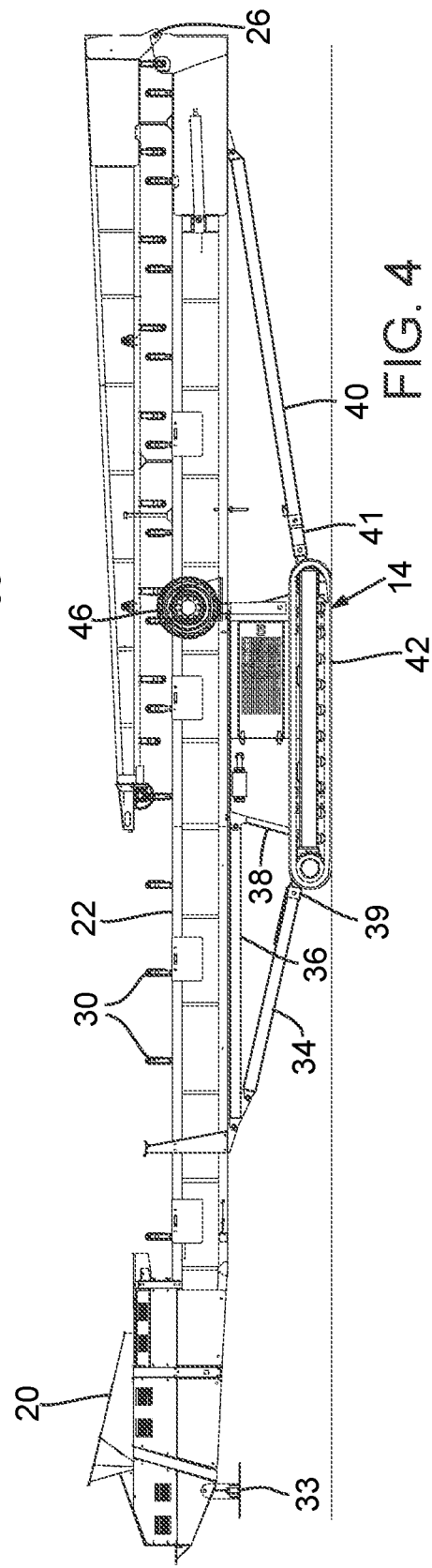
FIG. 4 is a side elevation view of the embodiment of FIG. 1, showing the mid-wheels in a raised position and the tracks supporting the stacker, with the stacker collapsed over itself for travel around the job site or elsewhere.

More specifically, conveyor 12 may include a hopper 20, a main conveyor portion 22 and a discharge end 24. The depicted conveyor includes a joint 26, which may permit the conveyor to double back over itself as shown in FIG. 4 to facilitate road travel. Hydraulic cylinders 28 may be provided at either side of conveyor 12 to facilitate the pivot action and control the position of discharge end 24 relative to main conveyor portion 22. Rollers 30 are typically included to guide a belt, which has been deleted from the figures to better show the features of the conveyor. A pivot point 32 may be provided under hopper 20 to facilitate the radial shifting of the conveyor. Pivot point 32 is typically designed to be readily replaced with a fifth wheel king pin mount 33 (see FIG. 14) to be mounted to a tractor for transport to another site, as will be explained more fully as this discussion continues.

Conveyor 12 is designed to be disposed in various angular positions for various levels of stacking and for transit. This capability may be facilitated by a pair of support frames disposed at each end of main portion 22 of the conveyor. These support frames also help raise and lower track system 14, as will be explained more fully below. Rear support frames 34 extend from track system 14 to the underside of rearward aspect of main portion 22 of the conveyor. Normally, rear support frames 34 will be of telescoping construction. One of the rear support frames 34 may be disposed on each lateral side of conveyor 12 to provide sufficient support and balance to the conveyor. A pair of rear intermediate support frames 36 may also be included, and in the depicted embodiment extend from a track system mounting frame 38 to the underside rear aspect of main portion 22 of the conveyor. Rear intermediate support frames 36 may also be telescoping, but typically are not.

Rear support frames 34 may be provided with hydraulic rams 39 to provide power to reposition the rear support frames and to raise and lower the rear end of conveyor 12 to permit stacker 10 to be repositioned to lower the tracks to the ground and to facilitate mounting of king pin 33 to a fifth wheel of a tractor. Rear support frames 34 may also be provided with pegs and complementing holes (not shown) to fix the support frame in position during operations when the hydraulic rams are not changing the position of the rear support frames.

A pair of front support frames 40 may also be provided to extend from track system 14 to the underside of a forward aspect of main portion 22 of the conveyor. Front support frames 40 are normally telescoping in configuration. One of the front support frames 40 may be disposed on each lateral side of conveyor 12 to provide sufficient support and balance to the conveyor. Front support frames 40 are normally provided with hydraulic rams 41 to provide power to reposition the support frames, and may be provided with pegs and complementing holes (not shown) to fix the support frame in position during operations when the hydraulic rams are not changing the position of the front support frame.

Track system 14 is conventional in that it includes a pair of continuous tracks 42 mounted to track system mounting frame 38. Tracks 42 are driven by an engine through either a mechanical transmission or hydraulic drive. The drive typically provides the capability of reversibility to maximize the maneuverability of the unit.

A bogie 44 for wheel system 16 is shown best in FIG. 3. Wheel system 16 typically includes a pair of wheels 46, although in FIGS. 12-19, in a slightly different embodiment, a pair of coaxial wheels 47 are depicted. However, coaxial wheels 47 will be sometimes described herein as though they are a single wheel. Wheels 46 and 47 will sometimes be referred to herein as mid-wheels since they are generally at a mid-point of the conveyor. Because the embodiment of FIGS. 12-19 is slightly different in the arrangement of the wheels but the rest of the stacker is the same, the numbers for this slightly different embodiment have are not different from the numbers in embodiment 1-11.

When in their lowered, lateral position (ready for either radial or 90 degree displacement of stacker 10) shown in FIGS. 1-3, 5-7, 9, 12-13, 17 and 19, wheels 46 or 47 support tracks 42 in an elevated position. With the wheels in the radial, lateral position, stacker 10 can be driven in a radial direction to provide a second conical stack of bulk material, or to provide additional stacks in an arc. With the wheels in a 90 degree lateral position, and pivot point 32 or king pin 33 mounted to a tracked bogie, such as that shown in FIGS. 5, 6 and 19, the stacks can take the form on a long pile, or the stacker can be used to fill one or more barges, trucks or rail cars. The additional tracked bogie 66 may be used to reposition a stacker for longitudinal displacement by shifting the additional bogie and wheels 47 by 90 degrees if for some reason that is preferable to operating the stacker through longitudinal movement of the tracks 42 of bogie 44.

To provide power drive to wheels 46 or 47, a chain drive 62 may be included as shown schematically in FIG. 10 or a hydraulic planetary drive motor 64 as shown in FIGS. 9 and 11.

After stacker 10 is properly positioned, wheels 46 can be translated to a raised position in which they no longer contact the ground, one of such positions being shown in FIGS. 3 (in phantom) and 8. In this raised position, wheels 46 also may rotate approximately 90 degrees, to the depicted position such that the axes of the wheels extend laterally of stacker 10. This rotation may be effected using hydraulics or some other power means or may be performed manually with pegs and complementing holes (not show).

Figure 18:
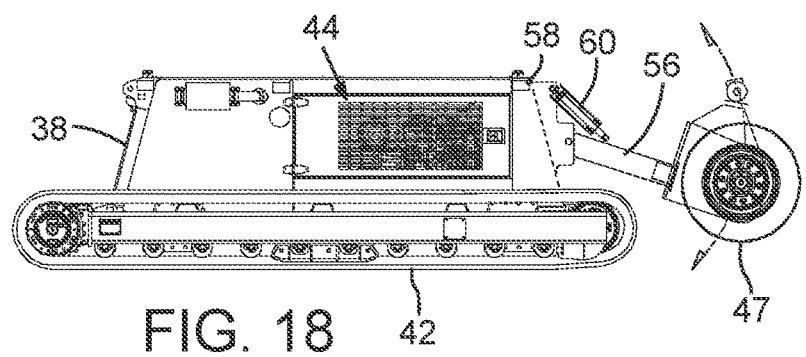
FIG. 18 is a side elevation view of a portion of the embodiment of FIG. 12 with double mid-wheels in their raised position and the track on the ground ready for travel around a job site or elsewhere.

The raised position of wheels 47 is shown in FIG. 18, although they may alternatively be raised from one of their lateral (radial or 90 degree) positions.

When wheels 46 are in their raised positions, tracks 42 contact the ground to ensure maximum maneuverability around the job site. With wheels 46 well up and out of the way as depicted in FIG. 3, there is little risk of the wheels and their tires being damaged despite the rough environment in which the stacker is operating. Wheels 46 are each supported by a leg 50, and are outfitted with a web 52. A hydraulic cylinder 54 extends between each of the two webs 52 of wheels 46 and bogie 44. The pair of hydraulic cylinders 54 maintain the two wheels in their lowered and raised positions, although pegs with complementing apertures (not shown) or other support means may also be included. Hydraulic cylinders 54 may sometimes be referred to herein as a mid-system.

Figure 7A:
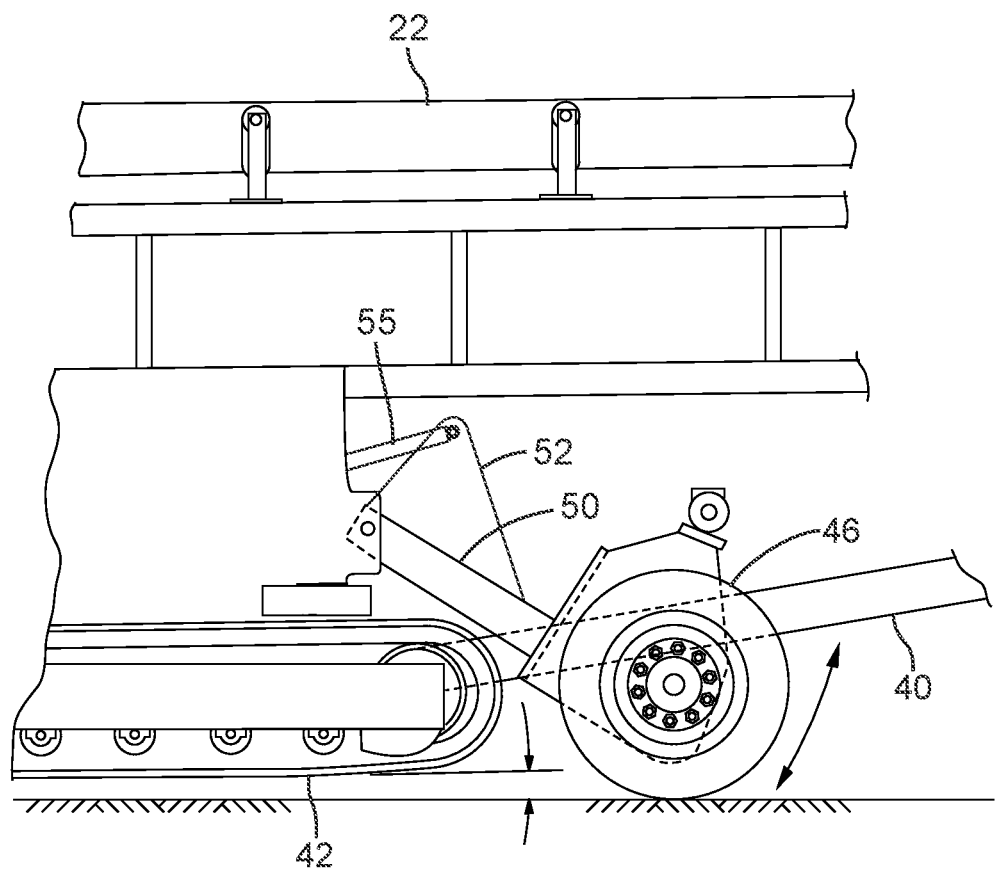
FIG. 7A is a variation of the embodiment of FIGS. 1-11 showing the mid-wheels in a lowered, longitudinal position ready to be shifted longitudinally at the work site or to be driven down a road, with the track lifted off the ground.

As shown in FIG. 7A, an additional set of hydraulic cylinders 55 may be included to pivot wheels 46 clockwise from the position shown in FIG. 4 to one in which the wheels contact the ground to raise tracks 42 off the ground. This longitudinal disposition of wheels 46 would to permit stacker 10 to be pulled down the road from one site to another.

The arrangement shown in FIGS. 12-19 is slightly different in that each wheel 47 includes a slightly different leg 56 that may be mounted to a vertical post 58. Post 58 may be rotatably mounted to bogie 44 so that wheels 47 may be swiveled from the longitudinal positions shown, for example, in FIG. 16, to the radial, lateral position shown in FIG. 17, or the 90 degree, lateral position. This swiveling may be performed manually or may be provided by a hydraulic motor or hydraulic cylinder drive. Wheels 47, legs 56 and posts 58 may also be provided with a hydraulic cylinders 60 for raising and lowering wheels 47.

Figure 12:
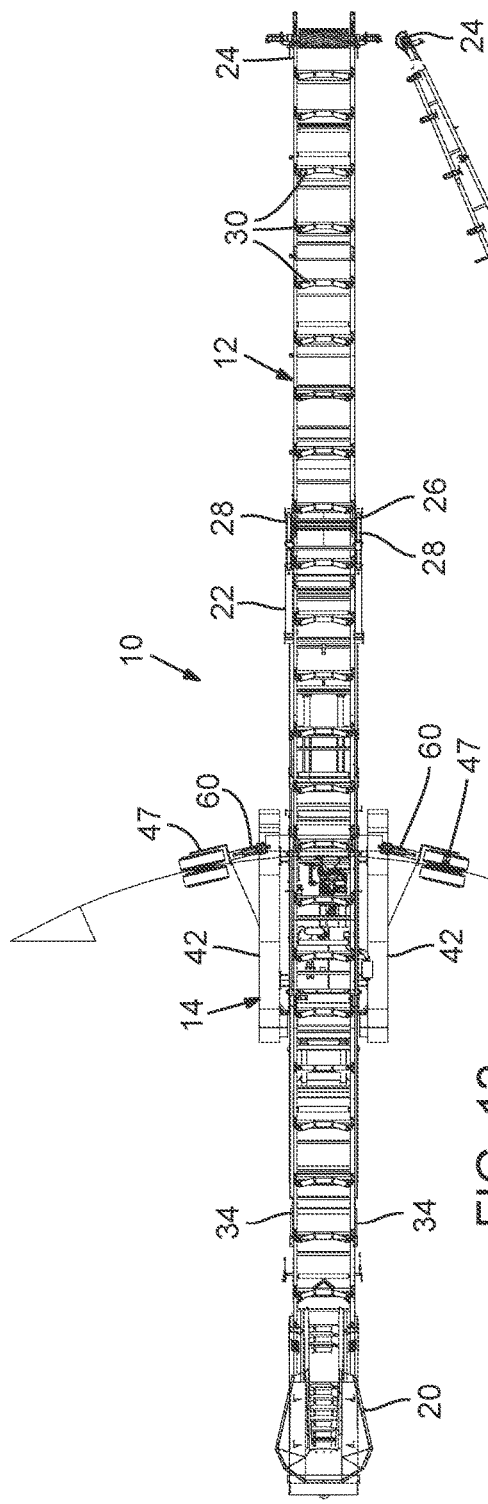
FIG. 12 is a top plan view showing a slightly different, double-wheeled embodiment, with the mid-wheels in their lowered position, ready for radial repositioning.
Figure 13:
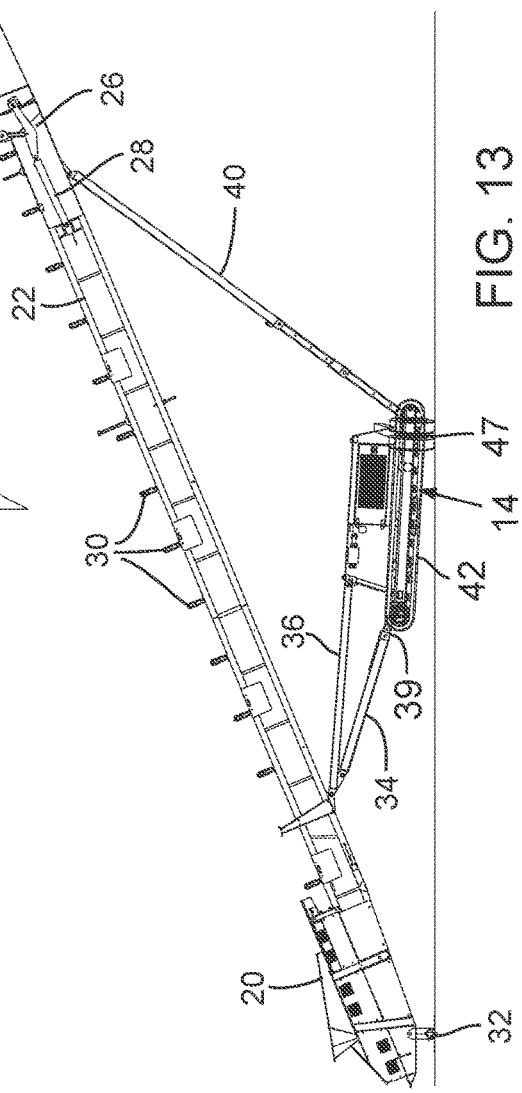
FIG. 13 is a side elevation view corresponding to FIG. 12, with the mid-wheels in their lowered position and the track elevated off the ground, ready for radial repositioning.
Figure 16:
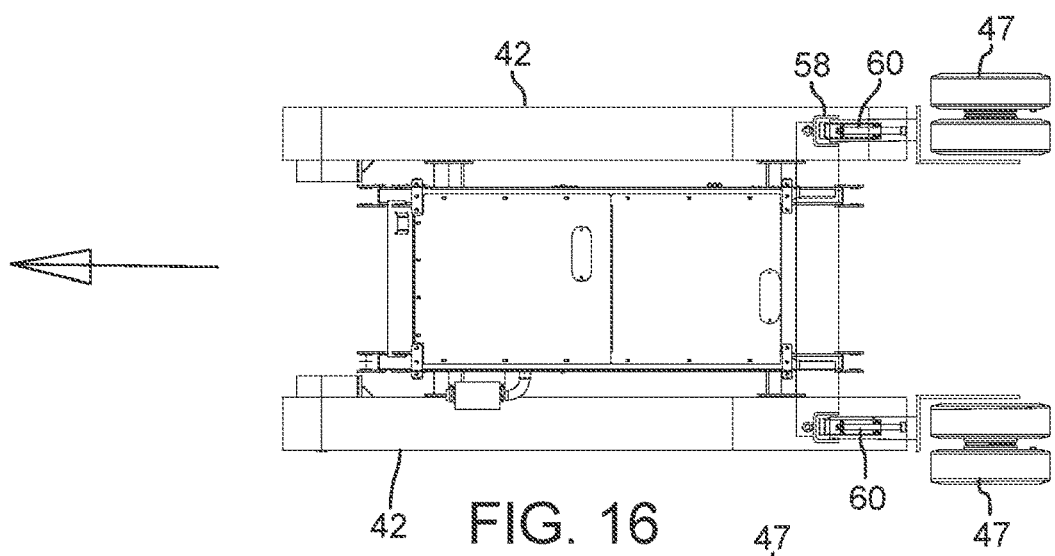
FIG. 16 is a top plan view of a portion of the embodiment of FIG. 12 showing double mid-wheels in their lowered, longitudinal position ready for road travel.
Figure 17:
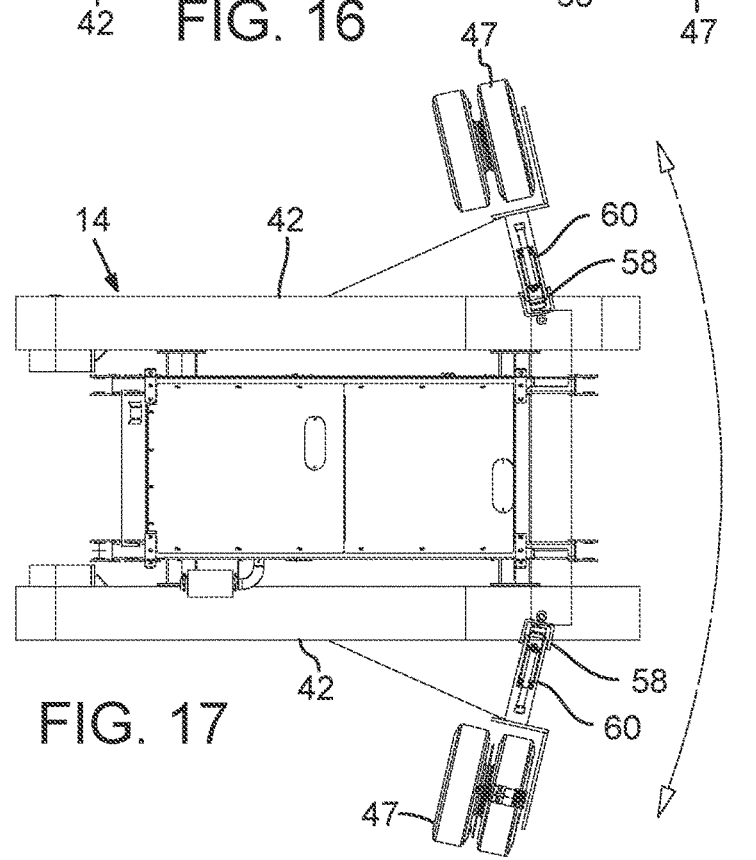
FIG. 17 is a top plan view corresponding to FIG. 16 except that the double mid-wheels are in their lowered position ready for radial displacement of the stacker.
Figure 18A:
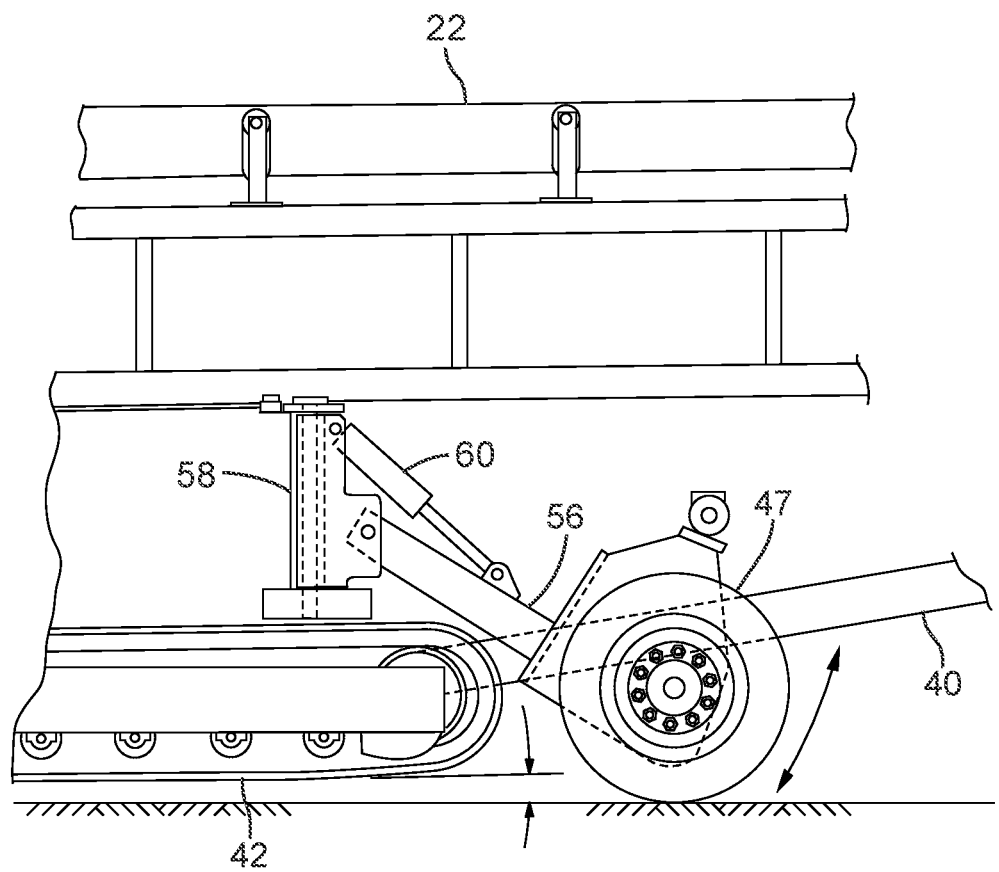
FIG. 18A is an enlarged side elevation view corresponding to FIG. 18 except that the mid-wheels are shown in their lowered, longitudinal position ready for longitudinal displacement down a road or elsewhere.
Figure 19:
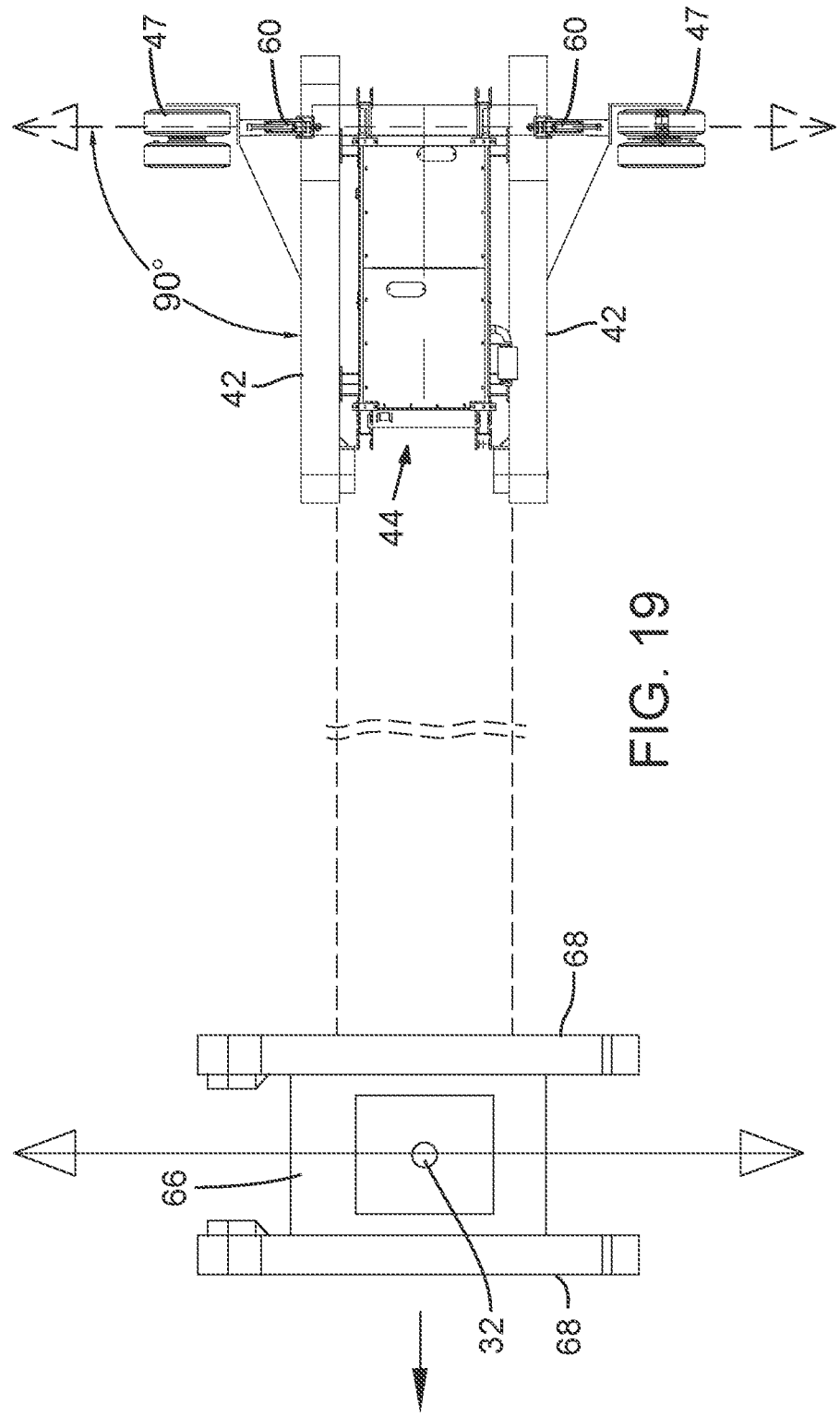
FIG. 19 is a fragmentary top plan view of the embodiment of FIG. 12 with the double mid-wheels in a lowered, 90 degree lateral position showing a tracked bogie disposed below the hopper, ready to move the stacker in a lateral direction.

Thus, with wheels 47 elevated off the ground as shown in FIG. 18, post 58 may be swiveled to a 90 degree lateral position or to a radial position such as that shown in FIG. 17. Wheels 47 may then be lowered to the ground and, powered by hydraulic cylinders 60, can then raise tracks 42 off the ground. Stacker 10 then is ready to be maneuvered around the job site if wheels 47 are in a lateral position as shown in FIGS. 12, 13 or 17 or can be pulled to another site if wheels 47 are in a longitudinal position as shown in FIGS. 16 and 18A. As described earlier, pegs and complementing apertures (not shown), or other fixation systems, might be included to lock the wheels in their lowered or raised positions.

Once the stacker has reached its destination, in order to prepare the stacker for operations, king pin mount 33 would first be disconnected from the fifth wheel of the tractor and would be replaced with pivot point 32. Any positioning pegs or other fixation means in hydraulic cylinders 50 would be removed and wheels 46 would be raised to their position shown in FIG. 4 or 18. This permits tracks 42 to be lowered to the ground so they now support stacker 10. Hydraulic cylinders 28 may then be operated to cause conveyor discharge end 24 to be pivoted from the position shown in FIG. 4, and hydraulic cylinder 41 in front support frames 40 is extended so conveyor 12 takes the position shown in FIGS. 2, 6 and 13.

If it is desired to move stacker 10 radially, either before, after or during this operation to raise the front of the conveyor, wheels 46 may be lowered from the raised position to the lowered position shown in FIG. 3. This may be done by extending hydraulic cylinders 54 until they reach the position depicted in solid lines in FIG. 3. This will raise tracks 42 off the ground as shown in FIG. 2. Or, if the radial position of stacker 12 is where it is desired, wheels 46 may be maintained in their raised position.

During operations, it is up to the operator to decide if the tracks or the wheels are in contact with the ground; that is, whether the wheels are in their raised position with the tracks in contact with the ground or in their lowered position, with the tracks elevated from contact with the ground. It is also up to the operator to decide, if the wheels are down, whether they be in a radial or longitudinal position. In any event, the operator is provided with a number of options.

Figure 14:
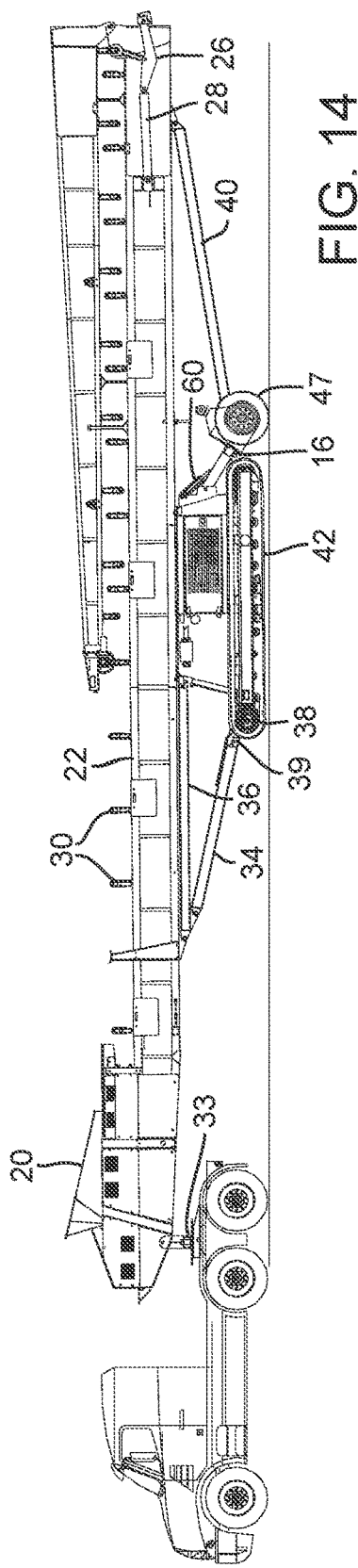
FIG. 14 is a side elevation view of the embodiment of FIG. 12 with the mid-wheels in their lowered, longitudinal position supporting the tracks above the road for travel, and with the rear end mounted to a tractor fifth wheel.
Figure 15:
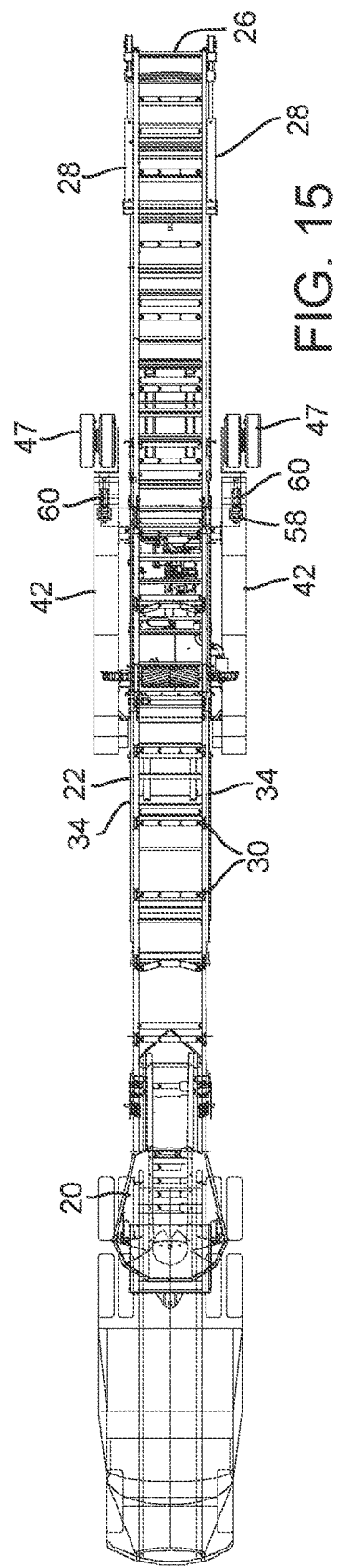
FIG. 15 is a top plan view corresponding to FIG. 14.

With the embodiment of FIGS. 12-19, to move stacker radially, either before, after or during the unfolding operation of the conveyor, wheels 47 and their legs 56 can be swiveled on posts 58 and then lowered by hydraulic cylinders 54. This will raise tracks 42 off the ground as shown in FIG. 13. Or, if the radial position of stacker 12 is where it is desired, wheels 47 may be maintained in their raised position, depending upon whether the operator wants to perform conveying operations with tracks 42 or wheels 47 on the ground supporting the stacker. When operations are completed and stacker 10 is to be moved to another site, hydraulic cylinders 54 raise legs 56 and wheels 47, posts 58 are swiveled to position wheels 47 longitudinally, and the cylinders can then lower the wheels to the position shown in FIGS. 14, 15 and 18A. Conveyor discharge end 24 is then pivoted through the operation of cylinders 28 to the position shown in FIG. 14 while cylinder 41 lowers that front end of the conveyor. In some instances, cylinders 39 may need to be operated to raise the rear end of conveyor 12 as necessary to facilitate the replacement of pivot point 32 with king pin mount 33, and position stacker 10 on the fifth wheel of the tractor as shown in FIG. 14.

FIGS. 20-23 depict another embodiment that is different in that it includes a rear wheel 70 and associated support structure. Other than the addition of rear wheel 70, the structure of this embodiment may be the same as the other embodiments. Therefore, the numbers used with the other embodiments have been carried over into FIGS. 20-23.

Rear wheel 70 may be mounted to adjacent the rear portion of stacker 10 by a pair of angularly-extending supports 72, which are pivotally mounted to the stacker so that a hydraulic cylinder 74 can pivot the rear wheel upwardly and downwardly. In its raised position, depicted in FIG. 22, it is up and out of the way. With rear wheel 70 in this position, the stacker may be moved about the work site on tracks 42.

Hydraulic cylinder 74, sometimes called a "rear system," is designed to selectively shift rear wheel 70 to a lowered position depicted in FIG. 23. As rear wheel 70 is being lowered into this position by hydraulic cylinder 74, pivot point 32 (sometimes called a "foot") is lifted off the ground. Thus, with rear wheel 70 in this lowered position, the stacker 10 may be moved about in a longitudinal direction, with either the tracks 42 or on mid-wheels 47 if they are in their longitudinal disposition shown in FIGS. 14, 15, 16, or 18A.

FIG. 23 depicts rear wheel 70 in its lowered, longitudinally-disposed position to enable longitudinal movement of the stacker. However, rear wheel 70 may be mounted to swivel with respect to the conveyor 12 to permit it to be translated to a lateral or radial disposition such as is shown in FIGS. 20 and 21. In this lateral disposition, and with wheels 47 (subsequently called mid-wheels to differentiate the rear wheel) in their lateral or radial disposition shown in FIGS. 20 and 21, the stacker may be moved laterally or in a radial arc, depending on the disposition of the mid-wheels. The swiveling capability may be powered by an appropriate hydraulic motor or other means, but the swiveling will normally be manually effected by releasing a lock (not shown) and re-engaging the lock when the swiveling is completed.

It is preferable that the rear wheel 70 and mid-wheels 47 be provided with means for powering them. This is normally done through hydraulic motors, which are schematically shown at 76 (for the rear wheel) and at 78 (for the mid-wheels). Depending on whether the rear wheel is being driven at the same speed as the mid-wheels, the stacker may be driven strictly to the side (if the wheels are driven at the same speed) or may be moved in a curved path (if the rear wheel is driven more slowly than the mid-wheels). This provides maximum flexibility to the operator in forming piles of bulk material with the stacker.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

The invention claimed is:

1. A tracked, portable radial stacker for stockpiling bulk material, comprising:
    a linear conveyor having a rear portion and a front portion and being designed to carry bulk material from a low position adjacent the rear portion to a higher position adjacent the front portion;
    a continuous track system including a frame to which the conveyor is mounted, the track system including a pair of driven, parallel tracks designed to contact the ground to convey the stacker from one position to another, and to be lifted off the ground when desired;
    a pair of mid-wheels mounted to the frame to be moveable between a raised position in which they do not contact the ground, permitting the tracks to contact the ground to convey the stacker from one position to another on the tracks and a lowered position in which the mid-wheels contact the ground and lift the tracks off the ground; and
    a rear wheel mounted adjacent the rear portion of the conveyor to be moveable between a raised position in which it does not contact the ground and a lowered position in which it contacts the ground and lifts the tracks off the ground to permit movement of the conveyor on the rear wheel.

2. The radial stacker of claim 1 wherein the mid-wheels and the rear wheel extend longitudinally.

3. The radial stacker of claim 1 wherein the mid-wheels and the rear wheel extend laterally.

4. The stacker of claim 1, further comprising a foot disposed adjacent the rear portion of the conveyor and designed to selectively contact the ground to facilitate pivoting of the conveyor.

5. The stacker of claim 1 wherein the pair of mid-wheels are moveable between raised and lowered positions, and in which each of the pair of mid-wheels do not need to be in the same raised or lowered position as the other of the pair of mid-wheels.

6. The stacker of claim 1 wherein each of the pair of mid-wheels may be disposed in different raised and lowered positions than the other of the pair of mid-wheels.

7. A tracked, portable radial stacker for stockpiling bulk material, comprising:
    a linear conveyor having a rear portion and a front portion and being designed to carry bulk material from a low position adjacent the rear portion to a higher position adjacent the front portion;
    a continuous track system including a frame to which the conveyor is mounted, the track system including a pair of driven, parallel tracks designed to contact the ground to convey the stacker from one position to another, and to be lifted off the ground when desired;
    a pair of mid-wheels mounted to the frame and a pair of mid-hydraulic cylinders for powering the mid-wheels between a raised position in which they do not contact the ground and a lowered position in which they contact the ground, the mid-hydraulic cylinders facilitating the lifting of the tracks off the ground as the mid-wheels are powered to their lowered position to permit movement of the conveyor on the mid-wheels; and a rear wheel mounted adjacent the rear portion of the conveyor, and a rear hydraulic cylinder for powering the rear wheel between a raised position in which it does not contact the ground and a lowered position in which it contacts the ground, the rear hydraulic cylinder facilitating the lifting of the rear portion of the conveyor off the ground as the rear wheel is powered to its lowered position to permit movement of the conveyor on the rear wheel.

8. The radial stacker of claim 7 wherein the mid-wheels and the rear wheel extend longitudinally.

9. The radial stacker of claim 7 wherein the mid-wheels and the rear wheel extend laterally.

10. The radial stacker of claim 7 wherein the mid-wheels and the rear wheel can be swiveled so the mid-wheels and the rear wheel can all extend either longitudinally or laterally.

11. The radial stacker of claim 7 wherein the mid-wheels and/or the rear wheel are powered to enable the stacker to be moved under power.

12. The radial stacker of claim 11 wherein both the mid-wheels and the rear wheels are powered at different speeds.

13. The stacker of claim 7, further comprising a foot disposed adjacent the rear portion of the conveyor and designed to selectively contact the ground to facilitate pivoting of the conveyor.

14. A tracked, portable radial stacker for stockpiling bulk material, comprising:
a linear conveyor having a rear portion and a front portion and being designed to carry bulk material from a low position adjacent the rear portion to a higher position adjacent the front portion;
a continuous track system including a frame to which the conveyor is mounted, the track system including a pair of driven, parallel tracks designed to contact the ground to convey the stacker from one position to another, and to be lifted off the ground when desired;
a pair of mid-wheels mounted to the frame and a pair of mid-hydraulic cylinders for powering the mid-wheels between raised positions in which the mid-wheels do not contact the ground and lowered positions in which the mid-wheels contact the ground, the mid-hydraulic cylinders facilitating the lifting of the tracks off the ground as the mid-wheels are powered to their lowered positions to permit movement of the conveyor on the mid-wheels;
a rear wheel mounted adjacent the rear portion of the conveyor, and a rear hydraulic cylinder for powering the rear wheel between raised positions in which the rear wheel does not contact the ground and lowered positions in which the rear wheel contacts the ground; and
a foot disposed adjacent the rear portion of the conveyor and designed to contact the ground to facilitate pivoting of the conveyor and wherein the rear hydraulic cylinder facilitates the lifting of the foot off the ground as the rear wheel is powered to a lowered position to permit movement of the conveyor on the rear wheel.

15. A tracked, portable radial stacker for stockpiling bulk material, comprising:
a linear conveyor having a rear portion and a front portion and being designed to carry bulk material from a low position adjacent the rear portion to a higher position adjacent the front portion;
a continuous track system including a frame to which the conveyor is mounted, the track system including a pair of driven, parallel tracks designed to contact the ground to convey the stacker from one position to another, and to be lifted off the ground when desired;
a pair of mid-wheels mounted to the frame to be moveable between a raised position in which they do not contact the ground and a lowered position in which the mid-wheels contact the ground; and
a rear wheel mounted adjacent the rear portion of the conveyor to be moveable between a raised position in which it does not contact the ground and a lowered position in which it contacts the ground and lifts the tracks off the ground to permit movement of the conveyor on the rear wheel.

* * * * *